(12) United States Patent
Yun et al.

(10) Patent No.: US 9,535,607 B2
(45) Date of Patent: Jan. 3, 2017

(54) SEMICONDUCTOR SYSTEM PERFORMING STATUS READ FOR SEMICONDUCTOR DEVICE AND OPERATING METHOD THEREOF

(71) Applicant: SK hynix Inc., Gyeonggi-do (KR)

(72) Inventors: Ho Jung Yun, Gyeonggi-do (KR); Se Chun Park, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 65 days.

(21) Appl. No.: 14/621,102

(22) Filed: Feb. 12, 2015

(65) Prior Publication Data

US 2016/0239206 A1    Aug. 18, 2016

(51) Int. Cl.
*G11C 8/00* (2006.01)
*G06F 3/06* (2006.01)

(52) U.S. Cl.
CPC ........... *G06F 3/0604* (2013.01); *G06F 3/0653* (2013.01); *G06F 3/0659* (2013.01); *G06F 3/0688* (2013.01)

(58) Field of Classification Search
CPC ......... G11C 7/22; G11C 7/222; G11C 7/1072; G11C 29/023; G11C 8/18
USPC ......................................... 365/233.1, 185.18
See application file for complete search history.

(56) References Cited

U.S. PATENT DOCUMENTS

2009/0089492 A1   4/2009   Yoon et al.
2009/0172213 A1*  7/2009   Jayachandran ....... G06F 3/0625
                                                        710/19

FOREIGN PATENT DOCUMENTS

KR   1020130073804   7/2013

* cited by examiner

*Primary Examiner* — Huan Hoang
(74) *Attorney, Agent, or Firm* — IP & T Group LLP

(57) ABSTRACT

A semiconductor system includes a semiconductor device suitable for receiving and performing a plurality of commands and a controller suitable for determining whether the semiconductor device completes an operation for each of the plurality of commands by performing one or more status reads for the semiconductor device whenever each of the plurality of commands is issued to the semiconductor device. The controller issues a first command among the plurality of commands to the semiconductor device, performs the one or more status reads for the semiconductor device to store a time taken to perform the first command as operation time information. The controller issues a second command among the plurality of commands to the semiconductor device, waits for a first wait time determined by the operation time information, and then performs the one or more status reads for the semiconductor device.

18 Claims, 12 Drawing Sheets

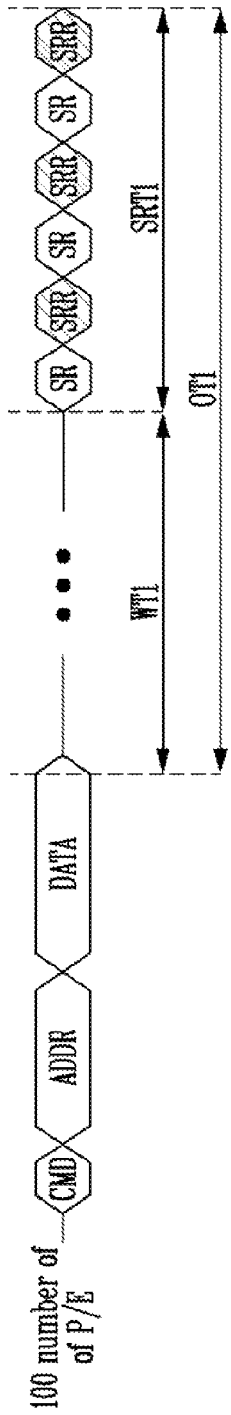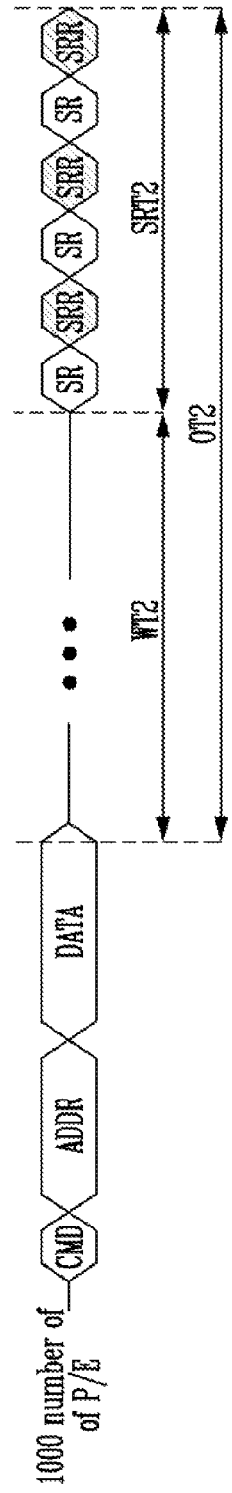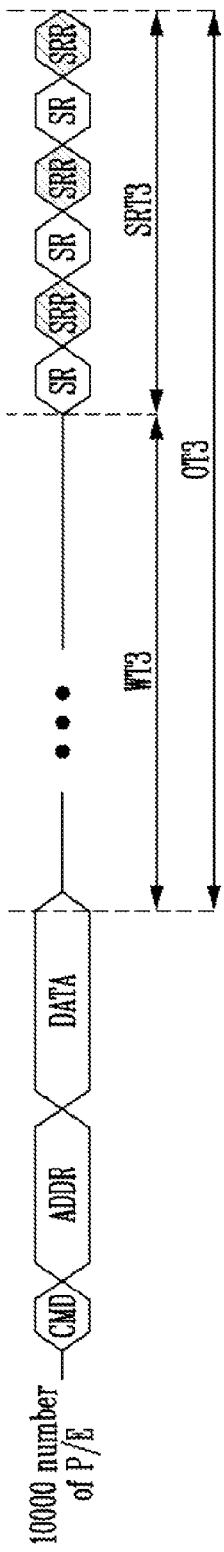

SEMICONDUCTOR SYSTEM PERFORMING STATUS READ FOR SEMICONDUCTOR DEVICE AND OPERATING METHOD THEREOF

BACKGROUND

Field of Invention

Various exemplary embodiments relate generally to an electronic device and more particularly, to a semiconductor system performing a status read for a semiconductor device and an operating method thereof.

A semiconductor device with many different functions, such as a large scale integration (LSI) device, may be coupled to a controller to drive the semiconductor device. The controller may issue a command to the semiconductor device and perform a status read while the semiconductor device is performing the command. According to the status read, the controller may determine whether the semiconductor device is ready for the next operation after completing the current command, or is still busy completing the current command.

However, if status reads are repeated, more power is consumed, which is undesirable.

SUMMARY

An embodiment is directed to a semiconductor system having reduced power consumption and improved operation performance and an operating method thereof.

A semiconductor system according to an embodiment of the present invention may include a semiconductor device suitable for receiving and performing a plurality of commands, and a controller suitable for determining whether the semiconductor device completes an operation for each of the plurality of commands by performing one or more status reads for the semiconductor device whenever each command is issued to the semiconductor device, wherein the controller issues a first command among the plurality of commands to the semiconductor device, performs the one or more status reads for the semiconductor device to store a time taken to perform the first command as operation time information, and the controller issues a second command among the plurality of commands to the semiconductor device, waits for a first wait time determined by the operation time information, and then performs the one or more status reads for the semiconductor device.

The first wait time may be shorter than the time taken to perform the first command by a predetermined time, or equal to the time.

A command type of each of the plurality of commands may correspond to one of a program command, a read command and an erase command, and the first command and the second command may be the same type of commands.

The controller may determine a time taken to perform the second command on the basis of the one or more status reads corresponding to the second command and update the operation time information on the basis of the time taken to perform the second command.

The controller may issue a third command to the semiconductor device, wait for a second wait time determined by the operation time information updated by the controller, and then perform the one or more status reads for the semiconductor device.

The one or more status reads corresponding to the second command may include first status reads, and second status reads, and the controller may perform each of the first status reads with a first period until a number of the first status reads reaches a predetermined threshold, and then each of the second status reads with a second period.

The first period may be longer than the second period.

The one or more status reads corresponding to the second command may include a predetermined number of first status reads, and second status reads, the controller may perform the second status reads after performing the predetermined number of the first status reads, time interval between the first status reads may increase whenever the first status reads are performed, and time interval between the second status reads may decrease whenever the second status reads are performed.

The controller may include a dynamic buffer memory, and the controller may store the operation time information in the dynamic buffer memory.

The semiconductor device may include non-volatile memory cell, and the controller stores the operation time information in the non-volatile memory cells.

A control method of a semiconductor device according to an embodiment of the present invention may include issuing a first command to the semiconductor device, waiting for a first wait time determined by operation time information, determining whether the semiconductor device completes an operation for the first command by performing one or more status reads for the semiconductor device after the first wait time, and updating the operation time information on the basis of a time taken to perform the operation for the first command when the semiconductor device completes the operation for the first command.

The control method may further include issuing a second command to the semiconductor device, waiting for a second wait time determined by the operation time information updated on the basis of the time, and determining whether the semiconductor device completes an operation for the second command by performing the one or more status reads for the semiconductor device after the second wait time.

The control method may include re-updating the operation time information on the basis of a time taken to perform the operation for the second command when the semiconductor device completes performing the operation for the second command.

The one or more status reads may include predetermined number of first status reads and second status reads, and the first status reads may be performed with a first period, and the second status reads may be performed with a second period.

The determining of whether the semiconductor device completes performing the first command may include performing a predetermined number of first status reads, and performing second status reads after performing the predetermined number of the first status reads, wherein a time interval between the first status reads may increase whenever the first status reads are performed, and a time interval between the second status reads may decrease whenever the second status reads are performed.

A semiconductor system according to an embodiment of the present invention may include a semiconductor device, and a controller suitable for issuing a command to drive the semiconductor device and determining whether the semiconductor device completes an operation for the command by performing a plurality of status reads for the semiconductor device after issuing the command, wherein the controller performs a predetermined number of first status reads, among the plurality of status reads, and subsequently performs second status reads, among the plurality of status reads, and a time interval between the second status reads may decrease whenever the second status reads are performed.

A time interval between the first status reads may increase whenever the first status reads are performed.

A time interval between the first status reads may be uniform and longer than the time interval between the second status reads.

The predetermined number may be varied by one or more of a number of program operations and a number of erase operations of the semiconductor device.

The controller may perform a plurality of status reads for the semiconductor device when a predetermined time passes after issuing the command.

A semiconductor system according to an embodiment of the present invention may include a semiconductor device suitable for performing an operation corresponding to a command, a controller suitable for outputting the command, and requesting a status of the operation to the semiconductor device a wait time after the output of the command. The controller may determine the wait time based on an operation time of the semiconductor device for a previous command that the controller previously outputs.

BRIEF DESCRIPTION OF THE DRAWINGS

FIGS. 7A to 7C are timing diagrams illustrating signals communicated between a controller and a semiconductor device according to an operating method shown in FIG. 6;

DETAILED DESCRIPTION

Figure 1:
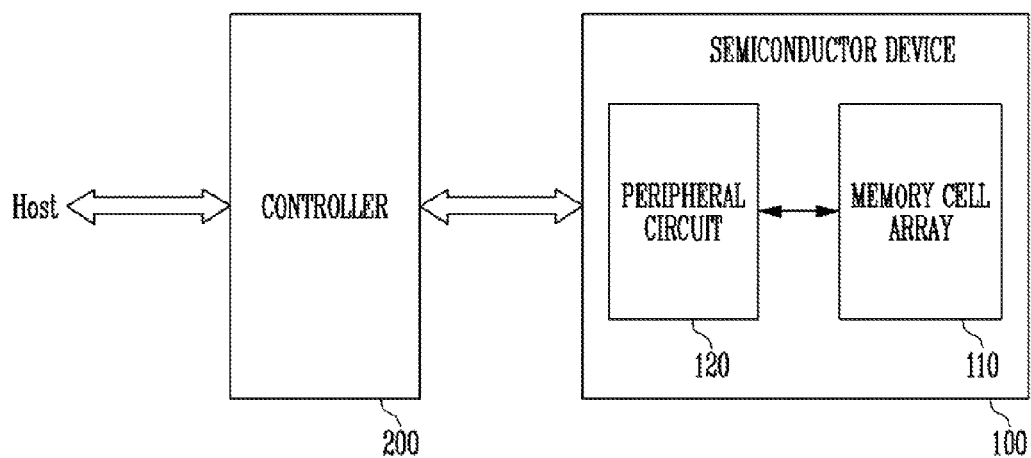
FIG. 1 is a diagram illustrating a semiconductor system including a semiconductor device and a controller.

Hereinafter, various embodiments of the present disclosure will be described in detail with reference to the accompanying drawings. The drawings are not necessarily to scale and, in some instances, proportions may have been exaggerated in order to clearly illustrate features of the embodiments. Moreover, detailed descriptions related to well-known functions or configurations will be ruled out in order not to unnecessarily obscure the subject matter of the embodiments. In the drawings, like reference numerals refer to like elements throughout.

It is also noted that, in this specification, "connected/coupled" refers to one component not only directly coupling another component but also indirectly coupling another component through an intermediate component. In addition, a singular form may include a plural form as long as it is not specifically mentioned in a sentence. Furthermore, 'include/comprise' or 'including/comprising' used in the specification represents that one or more components, steps, operations, and elements exist or are added.

Referring to FIG. 1, a semiconductor system 10 may include a semiconductor device 100 and a controller 200.

The semiconductor device 100 may be controlled by the controller 200. The semiconductor device 100 may be an integrated circuit and embodied by one or more chips. The semiconductor device 100 may perform a predetermined operation in response to control of the controller 200. According to an embodiment, the semiconductor device 100 may be a memory device. For example, the semiconductor device 100 may be one or more or a combination of a volatile memory device and a non-volatile memory device. According to another embodiment, the semiconductor device 100 may be a non-memory device.

When the semiconductor device 100 is a memory device, the semiconductor device 100 may include a memory cell array 110 and a peripheral circuit 120.

The memory cell array 110 may include a plurality of memory cells. The peripheral circuit 120 may perform a program operation, a read operation and an erase operation on the memory cell array 110 in response to a command from the controller 200. During the program operation, the peripheral circuit 120 may receive data from the controller 200 and store the received data in selected memory cells of the memory cell array 110. During the read operation, the peripheral circuit 120 may read the data stored in the selected memory cells of the memory cell array 110, and output the read data to the controller 200. During the erase operation, the peripheral circuit 120 may erase the data stored in the selected memory cells of the memory cell array 110.

The controller 200 may be coupled between a host and the semiconductor device 100. The controller 200 may output a command to the semiconductor device 100 in response to a request from the host. The semiconductor device 100 may perform the received command.

According to an embodiment, the controller 200 may control the semiconductor device 100 to perform the program operation, the read operation or the erase operation in response to the request from the host. During the program operation, the controller 200 may provide a command for the program operation (hereinafter, a program command), an address and data to the semiconductor device 100. The semiconductor device 100 may store the data in memory cells indicated by the address. During the read operation, the controller 200 may provide a command for the read operation (hereinafter, read command) and an address to the semiconductor device 100. The semiconductor device 100 may read data from memory cells indicated by the address and output the read data to the controller 200. During the erase operation, the controller 200 may provide a command for the erase operation (hereinafter, erase command) and an address to the semiconductor device 100. The semiconductor device 100 may erase data stored in memory cells indicated by the address.

The controller 200 may output a command to the semiconductor device 100 and check whether the semiconductor device 100 completes the corresponding operation for the command. The controller 200 may perform a status read for the semiconductor device 100 after providing the command. When the controller 200 output a status read signal to the semiconductor device 100, the semiconductor device 100 may provide a status read response signal to the controller 200. For example, the status read response signal has a first status value indicating that the semiconductor device 100 is busy performing the corresponding operation for the command. For example, the status read response signal has a second status value indicating that the semiconductor device 100 completes the corresponding operation for the command and is ready for a next operation corresponding to a next command.

When the controller 200 receives the status read response signal having the second status value from the semiconductor device 100, or the corresponding operation for the command is completed, the controller 200 may output the next command to the semiconductor device 100.

Figure 2:
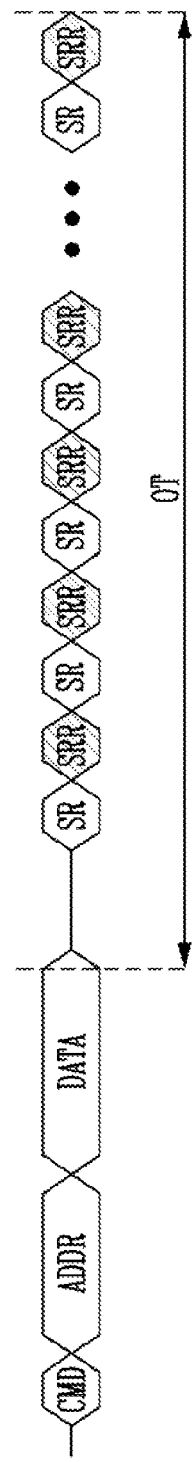
FIG. 2 is a timing diagram illustrating signals communicated between a controller and a semiconductor device.

FIG. 2 is a timing diagram illustrating signals communicated between the controller 200 and the semiconductor device 100.

Referring to FIGS. 1 and 2, the controller 200 may output a command CMD, an address ADDR and data DATA to the semiconductor device 100. For example, signals may be communicated between the controller 200 and the semiconductor device 100 during the program operation. During the program operation, the command CMD shown in FIG. 2 may be the program command. For example, during the read operation, the controller 200 may output the read command and an address to the semiconductor device 100. For example, during the erase operation, the controller 200 may output the erase command and an address to the semiconductor device 100.

The semiconductor device 100 may program the memory cells indicated by the address ADDR with the data DATA in response to the program command CMD. Based on the program command CMD, the address ADDR and the data DATA, the semiconductor device 100 may perform the program operation for an operation time OT.

The controller 200 may perform a plurality of status reads. During each of the status reads, the controller 200 may output the status read signal SR to the semiconductor device 100 and receive the status read response signal SRR from the semiconductor device 100. When the status read response signal SRR indicates that the semiconductor device 100 is busy performing the corresponding operation for the command CMD, the controller 200 may output again the status read signal SR to the semiconductor device 100. When the status read response signal SRR indicates that the semiconductor device 100 completes the corresponding operation for the command CMD, the controller 200 may not perform another status read. In the program operation, a time interval from output of the program command CMD, address ADDR and the data DATA to reception of the status read response signal SRR indicating that the semiconductor device 100 completes the corresponding operation for the program command CMD or the program operation may be defined as the operation time OT during which the program operation is performed. In the read operation, a time interval from output of the read command CMD and the address ADDR to reception of the status read response signal SRR indicating that the semiconductor device 100 completes the corresponding operation for the read command CMD or the read operation may be defined as an operation time OT during which the read operation is performed. In the erase operation, a time interval from output of the erase command CMD and the address ADDR to reception of the status read response signal SRR indicating that the semiconductor device 100 completes the corresponding operation for the erase command CMD or the erase operation may be defined as an operation time OT during which the erase operation is performed.

In FIG. 2, the controller 200 may continue performing status read during the operation time OT. When the number of status reads increases, power consumption of the semiconductor system 10 may be increased. In addition, when the number of status reads increases, performance of the semiconductor system 10 may be deteriorated due to resource allocation to perform status reads.

Figure 3:
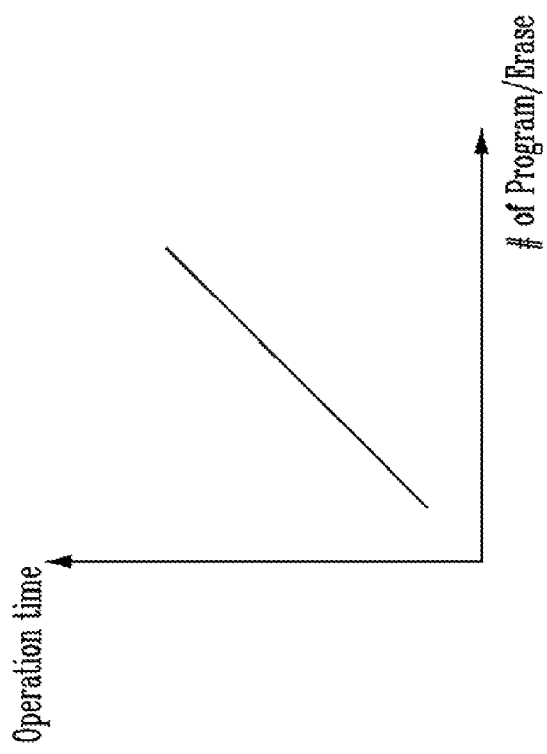
FIG. 3 is a graph illustrating the relationship between operation time and the number of program operations and erase operations.

FIG. 3 is a graph illustrating the relationship between the number of program operations and erase operations and operation time.

Referring to FIG. 3, as the number of program operations and erase operations performed by the semiconductor device 100 (hereinafter, number of program/erase cycles) increases, the operation time of the semiconductor device 100 may increase. For example, as the number of program/erase cycles increases, a time taken to perform each of the program operation, the read operation and the erase operation may be increased.

If the controller 200 keeps performing status reads after output of the command CMD even when the operation time increases, these status reads may increase the power consumption of the semiconductor system 10 and deteriorate the performance of the semiconductor system 10.

Figure 4:
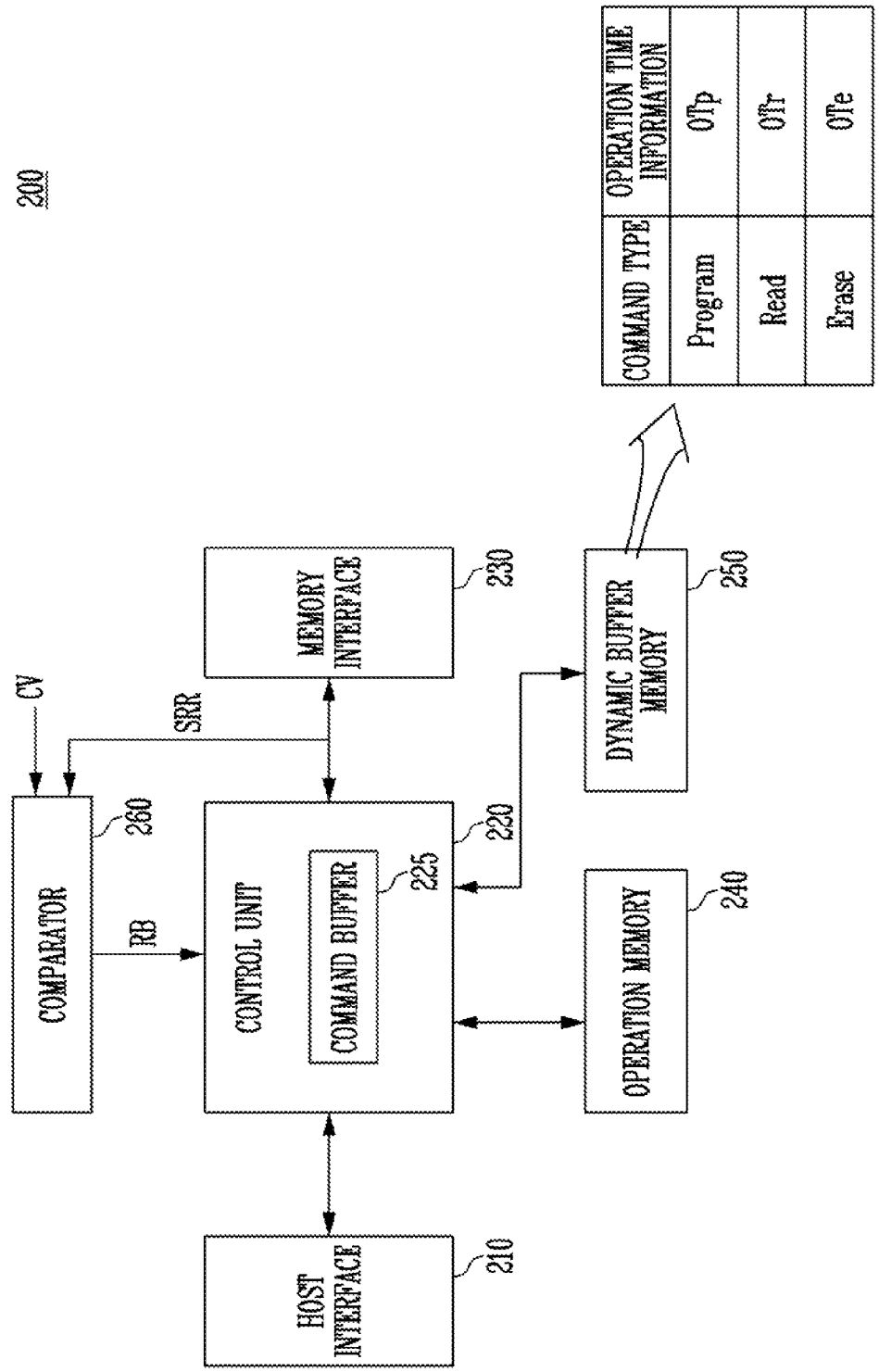
FIG. 4 is a block diagram illustrating a controller shown in FIG. 1 according to an embodiment.

FIG. 4 is a block diagram illustrating the controller 200 shown in FIG. 1 according to an embodiment.

Referring to FIGS. 1 and 4, the controller 200 may include a host interface 210, a control unit 220, a memory interface 230, an operation memory 240, a dynamic buffer memory 250 and a comparator 260.

The host interface 210 may interface with the host. The host interface 210 may include a protocol for data exchange between the host and the controller 200. For example, the controller 200 may communicate with the host through one or more of various protocols such as USB (Universal Serial Bus) protocol, MMC (MultiMedia Card) protocol, PCI (Peripheral Component Interconnection) protocol, PCI-E (PCI-Express) protocol, ATA (Advanced Technology Attachment) protocol, Serial-ATA protocol, Parallel-ATA protocol, SCSI (Small Computer Small Interface) protocol, ESDI (Enhanced Small Disk Interface) protocol, IDE (Integrated Drive Electronics) protocol and private protocol.

The control unit 220 may control the overall operation of the controller 200. The control unit 220 may be coupled to the host Interface 210 and the memory interface 230.

The control unit 220 may include a command buffer 225. The control unit 220 may receive a request from the host through the host interface 210. The request from the host may be stored in the command buffer 225 as the command CMD. According to an embodiment, the control unit 220 may use the command buffer 225 on a First-In First-Out (FIFO) basis.

According to an embodiment, the address ADDR and the data DATA to be outputted to the semiconductor device 100 may be stored in the operation memory 240.

According to an embodiment, the control unit 220 may generate the command CMD without any request from the host and store the generated command CMD in the command buffer 225. For example, the control unit 220 may generate commands for background operations such as the program operation and the read operation for wear leveling and/or garbage collection, and store the generated commands in the command buffer 225.

The control unit 220 may output the command CMD stored in the command buffer 225 to the memory interface 230. When the command CMD is outputted to the memory interface 230, the control unit 220 may output the corresponding address ADDR and the corresponding data DATA stored in the operation memory 240 to the memory interface 230.

The memory interface 230 may interface with the semiconductor device 100. For example, when the semiconductor device 100 is a flash memory, the memory interface may include a NAND interface or a NOR interface.

The memory interface 230 may transfer the command CMD, the address ADDR and the data DATA from the control unit 220 to the semiconductor device 100.

According to an embodiment, the controller 200 may further include the dynamic buffer memory 250. The dynamic buffer memory 250 may store operation time information corresponding to each command type. As shown in FIG. 4, program operation time information OTp corresponding to the program operation, read operation time information OTr corresponding to the read operation, and erase operation time information OTe corresponding to the erase operation may be stored in the dynamic buffer memory 250. Each operation time information may refer to the time taken to perform each corresponding operation, i.e., the operation time OT shown in FIG. 2. The control unit 220 may wait for a wait time corresponding to the operation time information stored in the dynamic buffer memory 250 after the corresponding command CMD is issued. For example, the control unit 220 may wait for a wait time corresponding to the program operation time information OTp after the program command is issued. For example, the control unit 220 may wait for a wait time corresponding to the read operation time information OTr after the read command is issued. For example, the control unit 220 may wait for a wait time corresponding to the erase operation time information OTp after the erase command is issued.

According to an embodiment, the control unit 220 may wait for a time less than the operation time indicated by the operation time information by a predetermined time. According to another embodiment, the control unit 220 may wait for the operation time indicated by the operation time information.

After the wait time passes, the control unit 220 may perform one or more status reads. The control unit 220 may output the status read signal SR through the memory interface 230. Thus, the status read response signal SRR may be received from the semiconductor device 100.

The comparator 260 may receive the status read response signal SRR. The comparator 260 may compare a comparison value CV with the status read response signal SRR and output a comparison result to the control unit 220. For example, as illustrated in FIG. 4, the comparison result may be provided as a ready busy signal RB to the control unit 220.

The comparison value CV may be the same value as the status read response signal SRR indicating that the semiconductor device 100 completes the corresponding operation for the command CMD.

The comparator 260 may enable the ready busy signal RB when the comparison value CV and the status read response signal SRR coincide with each other. The comparator 260 may disable the ready busy signal RB when the comparison value CV and the status read response signal SRR do not coincide with each other. The control unit 220 may output again the status read signal SR in response to the enabled ready busy signal RB.

According to another embodiment, the comparator 260 may provide the comparison result between the comparison value CV and the status read response signal SRR as a plurality of data bits, instead of the ready busy signal RB, to the control unit 320. For example, when the comparison value CV and the status read response signal SRR coincide with each other, the comparator 260 may output data bits having a predetermined value to the control unit 320. The data bits having the predetermined value may indicate that the semiconductor device 100 completes the corresponding operation for the command CMD.

In this manner, the status reads may be performed' until the status read response signal SRR indicates that the semiconductor device 100 completes the corresponding operation for the command CMD.

According to an embodiment, when the status read response signal SRR indicates that the semiconductor device 100 completes the corresponding operation for the command CMD, the control unit 220 may update the time taken to perform the command CMD as the operation time information. During the program operation, the program operation time information OTp may be updated. During the read operation, the read operation time information OTr may be updated. During the erase operation, the erase operation time information OTe may be updated.

As the time taken to perform the command CMD increases, the operation time indicated by the corresponding operation time information may be increased. When the time taken to complete the corresponding operation for the command CMD increases, the control unit 220 may wait for a longer period of time and perform the status read when issuing the next command CMD. As a result, the wait time may be adaptively changed. Therefore, the number of status reads performed may be reduced.

As described above with reference to FIG. 3, when the operation time of the semiconductor device 100 increases due to the increased number of program/erase cycles, the control unit 220 may have the increased wait time. Therefore, the power consumption of the semiconductor system 10 may be reduced, and the performance of the semiconductor system 10 may be improved.

Figure 5:
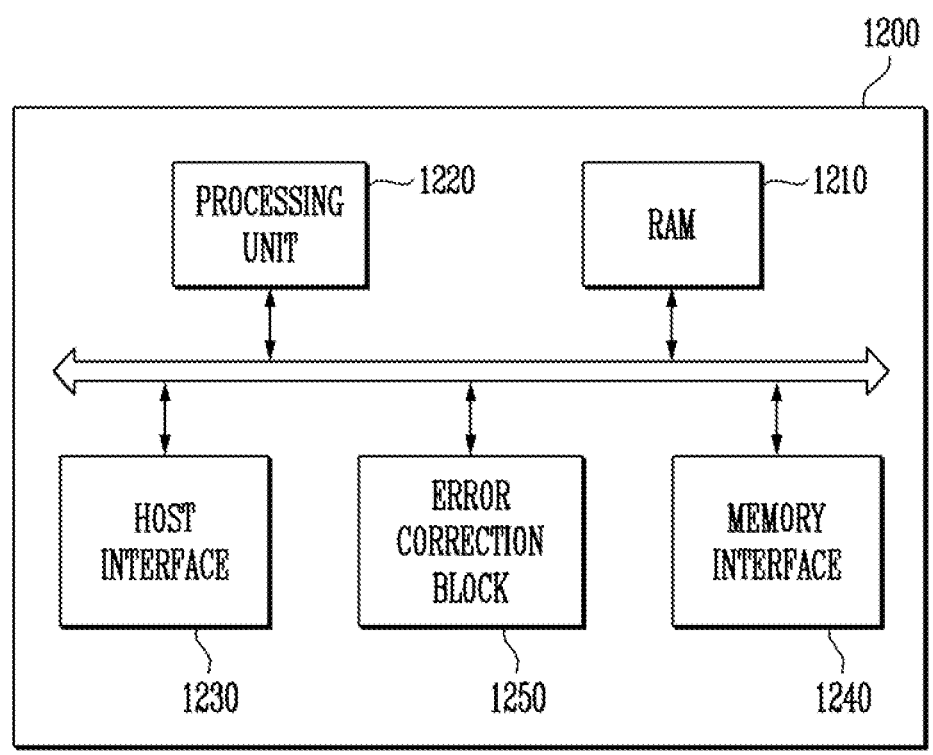
FIG. 5 is a block diagram illustrating an embodiment for realizing a controller shown in FIG. 4.

FIG. 5 is a block diagram illustrating one embodiment 1200 of the controller 200 shown in FIG. 4.

Referring to FIG. 5, the controller 1200 may include a Random Access Memory (RAM) 1210, a processing unit 1220, a host interface 1230, a memory interface 1240, a memory interface and an error correction block 1250.

The processing unit 1220 may control the overall' operation of the controller 1200. The RAM 1210 may be used as one or more of an operation memory of the processing unit 1220, a cache memory between the semiconductor device 100 and the host, and a buffer memory between the semiconductor device 100 and the host. The processing unit 1220 and the RAM 1210 may perform functions of the control unit 220 and the comparator 260 described with reference to FIG. 4.

In addition, the RAM 1210 may function as the operation memory 240 shown and the dynamic buffer memory 250 described with reference to FIG. 4.

FIG. 5 illustrates the single RAM 1210. However, two or more RAMs may be provided.

The host interface 1230 and the memory interface 1240 may perform the functions of the host interface 210 and the memory interface 230 described with reference to FIG. 4, respectively.

According to an embodiment, the error correction block 1250 may be provided. The error correction block 1250 may detect errors in the data from the semiconductor device 100 by using an error correcting code (ECC).

Figure 6:
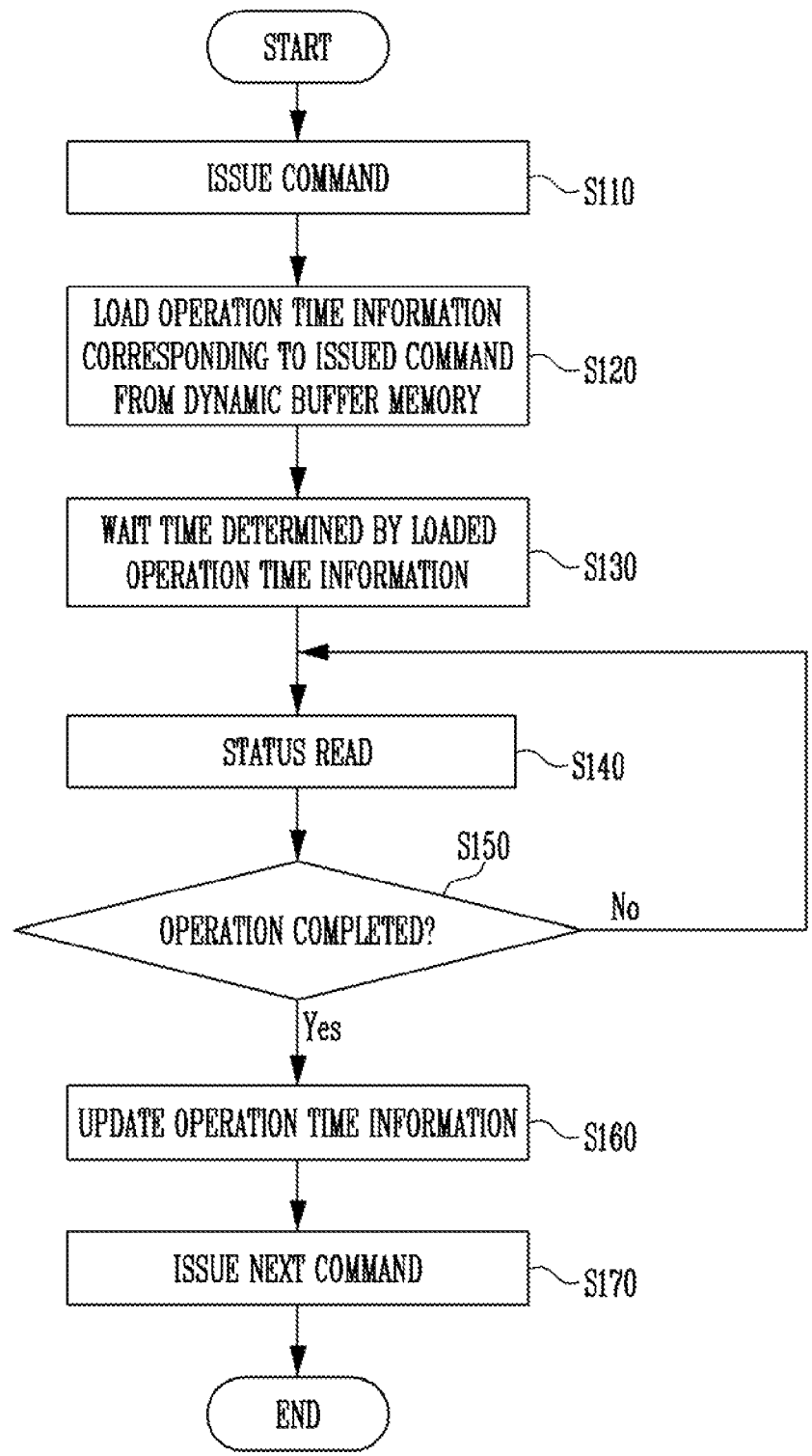
FIG. 6 is a flowchart illustrating an operating method of a controller shown in FIG. 4.

FIG. 6 is a flowchart illustrating an operating method of the controller 200 shown in FIG. 4.

Referring to FIGS. 4 and 6, at step S110, the controller 200 may issue a command to the semiconductor device 100. At step S120, operation time information corresponding to the issued command may be loaded. The operation time information may be loaded to the control unit 220 from the dynamic buffer memory 250. Step S120 may precede step S110.

At step S130, the controller 200 may wait for a wait time corresponding to the loaded operation time information. The controller 200 may not perform the status read during the wait time. The controller 200 may save power for the status read during the wait time.

At step S140, after the wait time passes, the controller 200 may perform the status read. At step S150, as a result of the status read, when the semiconductor device 100 does not complete the corresponding operation for the issued command, the process may go back to step S140. The status read may be repeated until the semiconductor device completes the corresponding operation for the issued command. As a result of the status read at step S150, when the semiconductor device 100 completes the corresponding operation for the issued command, step S160 may be performed.

At step S160, the controller 200 may update the operation time information on the basis of the time taken to complete the corresponding operation for the issued command. The control unit 220 may update the corresponding operation time information of the dynamic buffer memory 250. During the program operation, the program operation time information OTp may be updated. During the read operation, the read operation time information OTr may be updated. During the erase operation, the erase operation time information OTe may be updated.

According to an embodiment, step S160 may be selectively performed. For example, the operation time information may be updated whenever a predetermined number of operations are performed. In other words, step S160 may be omitted when a certain operation corresponding to the command is performed. In another example, the operation time information may be updated whenever the operation corresponding to the command is performed.

When the semiconductor device 100 completes the corresponding operation for the issued command, it may mean that the semiconductor device 100 becomes ready for the next command. At step S170, the controller 200 may issue the next command. Step S170 may be performed in parallel with step S160. Step S170 may precede step S160.

FIGS. 7A to 7C are timing, diagrams illustrating signals communicated between the controller 200 and the semiconductor device 100 according to the operating method shown in FIG. 6. In connection with FIG. 7, signals which are communicated during the program operation are exemplified for convenience of explanation.

Referring to FIG. 7A, the controller 200 may output the command CMD, the address ADDR and the data DATA to the semiconductor device 100. The semiconductor device 100 may program memory cells indicated by the address ADDR with the data DATA. When the number of program/erase cycles is approximately 100, it may take the first operation time OT1 to perform the program operation of the semiconductor device 100.

The controller 200 may output the command CMD, the address ADDR and the data DATA and wait for a first wait time WT1 corresponding to the program operation time information OTp after the program command CMD is issued as described with reference to FIG. 4. For example, the first wait time WT1 may be obtained by subtracting a predetermined time from the operation time corresponding to the program operation time information OTp. In another example, the first wait time WT may be obtained by the operation time corresponding to the program operation time information OTp.

After the first wait time WT1 passes, the controller 200 may perform one or more status reads for a first status read period SRT1. The controller 200 may output the status read signal SR to the semiconductor device 100. The semiconductor device 100 may output the status read response signal SRR to the controller 200 in response to the status read signal SR. According to an embodiment, the command CMD, the address ADDR, the data DATA, the status read signal SR and the status read response signal SRR may be communicated through the same input/output lines. When the status read response signal SRR indicates that the program operation is not completed, the controller 200 may re-perform the status read. When the status read response signal SRR indicates that the program operation is completed, the controller 200 may not perform another status read. FIG. 7A illustrates performing three status reads.

A time interval from output of the command CMD, the address ADDR and the data DATA to the semiconductor device 100, i.e., a time at which the controller 200 requests the semiconductor device 100 to perform the command CMD, to reception of the status read response signal SRR indicating that the program operation is completed may be defined as the first operation time OT1.

The controller 200 may update the program operation time information OTp on the basis of the first operation time OT1. During the next program operation, the controller 200 may determine the wait time WT corresponding to the updated program operation time information OTp.

Referring to FIG. 7B, when the number of program/erase cycles is approximately 1,000, it may take a second operation time OT2 longer than the first operation time OT1 to perform the program operation of the semiconductor device 100.

The controller 200 may wait for a second wait time WT2 corresponding to the updated program operation time OTp after the command CMD, the address ADDR and the data DATA are provided to the semiconductor device 100. The updated program operation time information OTp may reflect the operation time taken to perform the previous program operation.

As the number of program/erase cycles increases, the time taken to perform each program operation may increase. As the time taken to perform the program operation increases, the wait time WT may also increase. The second wait time WT2 may be longer than the first wait time WT1.

After the second wait time WT2, the controller 200 may perform one or more status reads for a second status read period SRT2. The status read may be repeated until the status read response signal SRR indicating that the current program operation for the currently issued program command is completed is received. When the status read response signal SRR indicating that the current program operation for the currently issued program command is completed is received, the controller 200 may detect that it takes the second operation time OT2 to perform the current program operation, and update the program operation time information OTp on the basis of the second operation time OT2.

Referring to FIG. 7C, when the number of program/erase cycles is approximately 10,000, it may take a third operation time OT3 longer than the second operation time OT2 to perform the program operation of the semiconductor device 100.

After output of the command CMD, the address ADDR and the data DATA to the semiconductor device 100, the controller 200 may wait for a third wait time WT3 corresponding to the updated program operation time information OTp. As the number of program/erase cycles increases, the time taken to perform the program operation may increase. The time taken to perform the program operation may be reflected in the program operation time information OTp. Therefore, the third wait time WT3 may be longer than the second wait time WT2.

After the third wait time WT3 passes, the controller 200 may perform one or more status reads for a third status read period SRT3. When the status read response signal SRR indicating that the current program operation for the currently issued program command is completed is received, the status read may not be performed.

A time interval from output of the request of the controller 200 to perform the command CMD to reception of the status read response signal SRR indicating that the semiconductor device 100 completes the corresponding program operation for the currently issued program command CMD may be defined as the third operation time OT3. The controller 200 may update the program operation time information OTp according to the third operation time OT3.

As illustrated in FIGS. 7A to 7C, as the number of program/erase cycles increases, the operation time OT1 to OT3 taken to perform the program operation may increase. The operation time taken to perform the program operation may be reflected in the program operation time information OTp. As the time taken to perform the program operation increases, the wait time WT1 to WT3 may be increased in response to the program operation time information OTp. As a result, the number of status reads performed may be reduced since the wait time is adaptively changed. Therefore, power consumption of the semiconductor system 10 may be reduced, and performance of the semiconductor system 10 may be improved.

Figure 8:
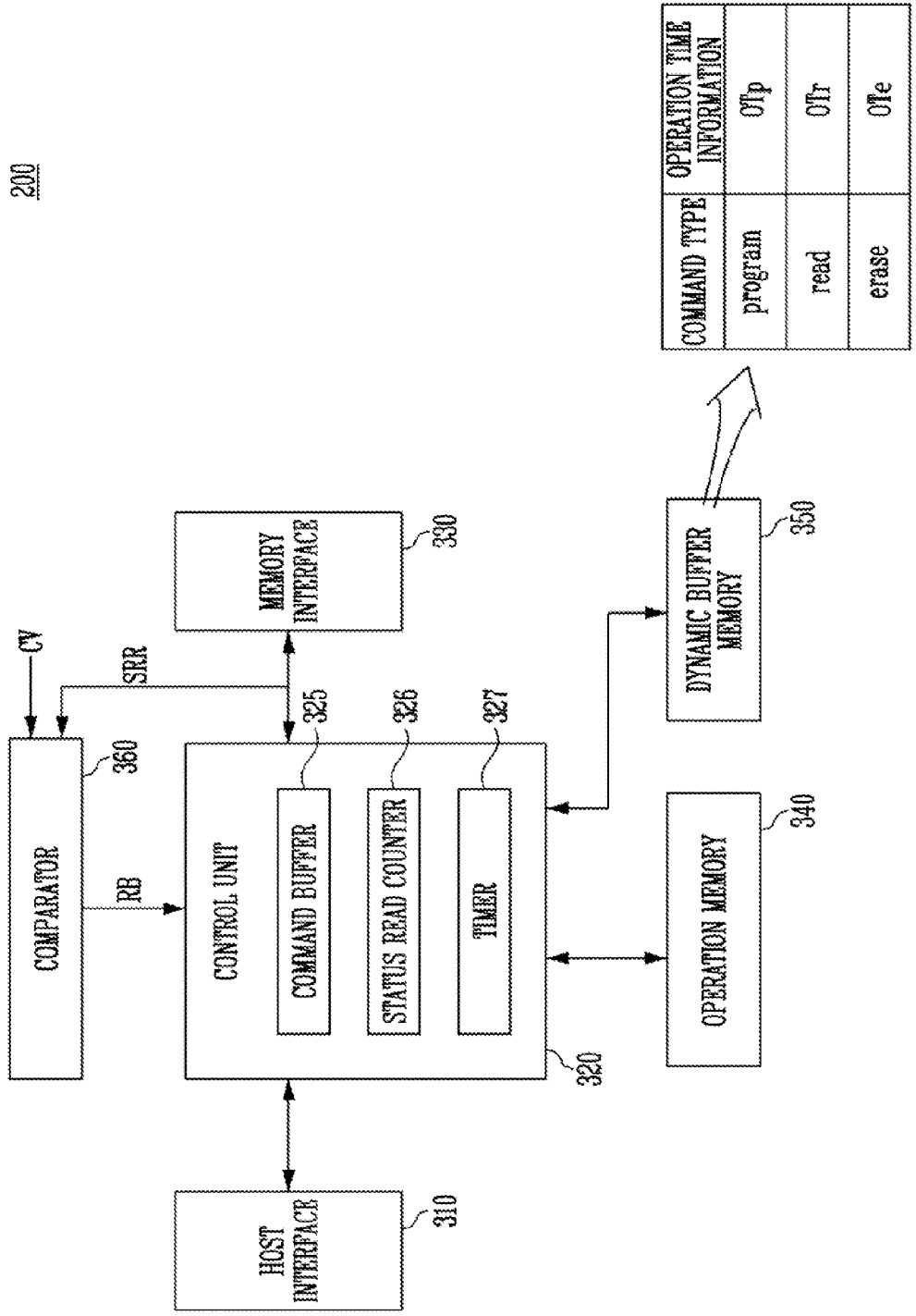
FIG. 8 is a block diagram illustrating a controller shown in FIG. 1 according to another embodiment.

FIG. 8 is a block diagram illustrating the controller 200 shown in FIG. 1 according to another embodiment.

Referring to FIGS. 1 and 8, the controller 200 may include a host interface 310, a control unit 320, a memory interface 330, an operation memory 340, a dynamic buffer memory 350 and a comparator 360.

The host interface 310, the memory interface 330, the operation memory 340, the dynamic buffer memory 350 and the comparator 360 may be substantially the same as the host interface 210, the memory interface 230, the operation memory 240, the dynamic buffer memory 250 and the comparator 260 described above with reference to FIG. 4, respectively.

The control unit 320 may include a command buffer 325, a status read counter 326 and a timer 327. The command buffer 325 may be substantially the same as the command buffer 225 described above with reference to FIG. 4.

The status read counter 326 may perform counting whenever the status read is performed. In other words, the number of status reads performed may be counted by the status read counter 326.

The timer 327 may provide an elapsed time value. A period with which the status read is performed may be determined by the elapsed time value provided by the timer 327.

According to an embodiment, the control unit 320 may perform the status reads with a first period P1 until the number of the status reads reaches a predetermined threshold, and perform the status reads with a second period P2 after the number of status reads reaches the predetermined threshold, which will be described with reference to FIGS. 9 and 10. The control unit 320 may detect the number of status reads based on the count value from the status read counter 326.

Figure 9:
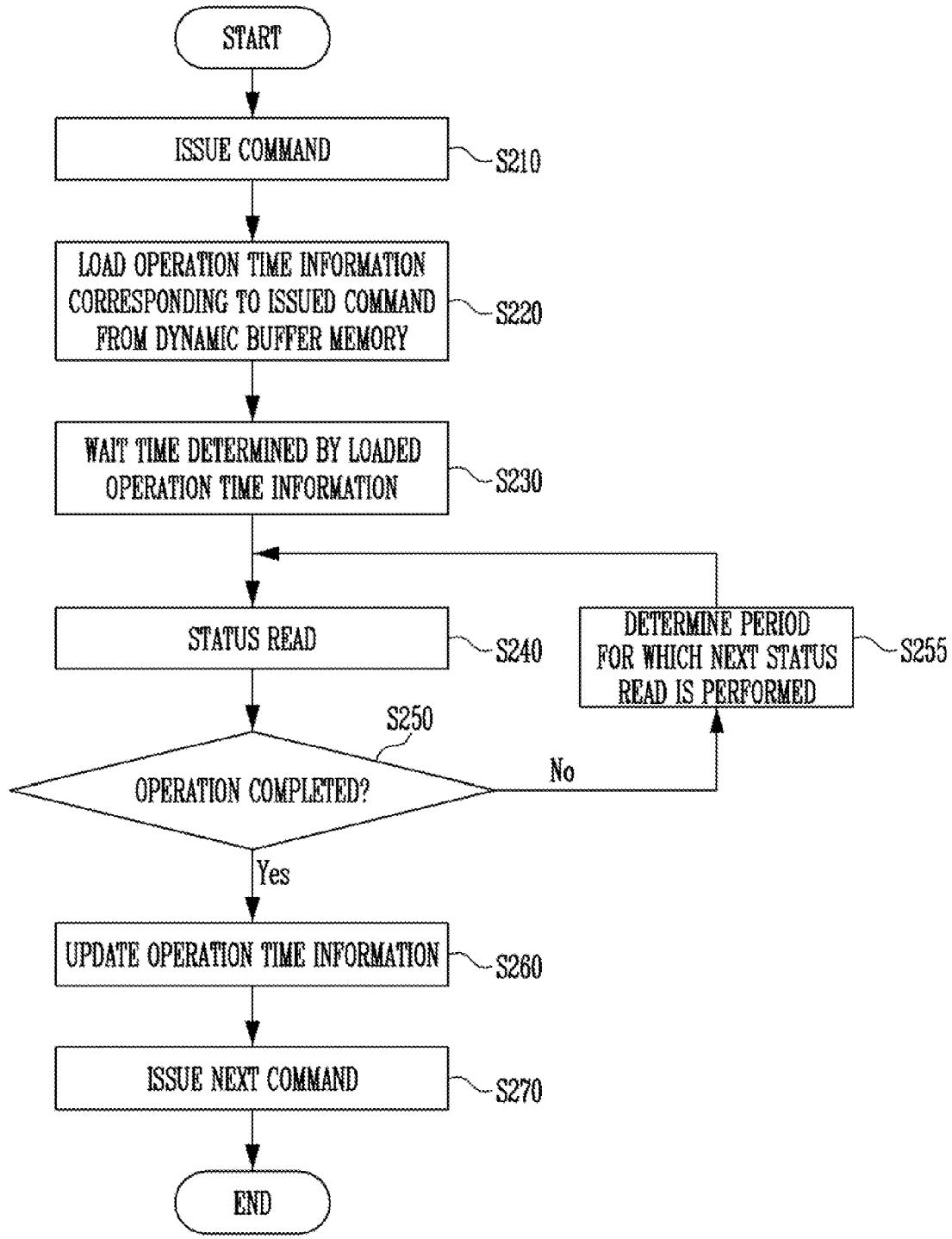
FIG. 9 is a flowchart illustrating an operating method of a controller shown in FIG. 8.

FIG. 9 is a flowchart illustrating an operating method of the controller 200 shown in FIG. 8.

Referring to FIGS. 8 and 9, the operating method shown in FIG. 9 may be substantially the same as the operating method described with reference to FIG. 6 except for step S255. Steps S110 to S170 may correspond to steps S210 to S270, respectively, except for step S255.

At step S250, as a result of the status read, when the semiconductor device 100 does not complete the corresponding operation for the issued command, the process may go to step S255. The status read may be repeated until the semiconductor device completes the corresponding operation for the issued command. As a result of the status read at step S250, when the semiconductor device 100 completes the corresponding operation for the issued command, step S260 may be performed.

At step S255, the controller 200 may determine a period with which the next status read is performed. The control unit 320 may obtain the number of performed status reads from the status read counter 326, which performs the counting whenever the status read is performed, and compare the number of status reads performed with a predetermined threshold. While the number of status reads performed is less than the predetermined threshold, the status reads may be performed with the first period P1. When the number of status reads is greater than or equal to the predetermined threshold, the status reads may be performed with the second period P2. The first period may be longer than the second period.

According to an embodiment, reduced number of status reads may be performed by performing the status reads with the first period P1, whish is relatively long, until the number of status reads performed reaches the predetermined threshold. Therefore, the power consumption of the semiconductor system 10 may be reduced.

When the number of status reads performed reaches the predetermined threshold, the corresponding operation for the issued command may be likely to be completed. By performing the status reads with the second period P2, which is relatively short, the controller 200 may quickly detect when the semiconductor device completes the corresponding operation for the issued command.

Figure 10:
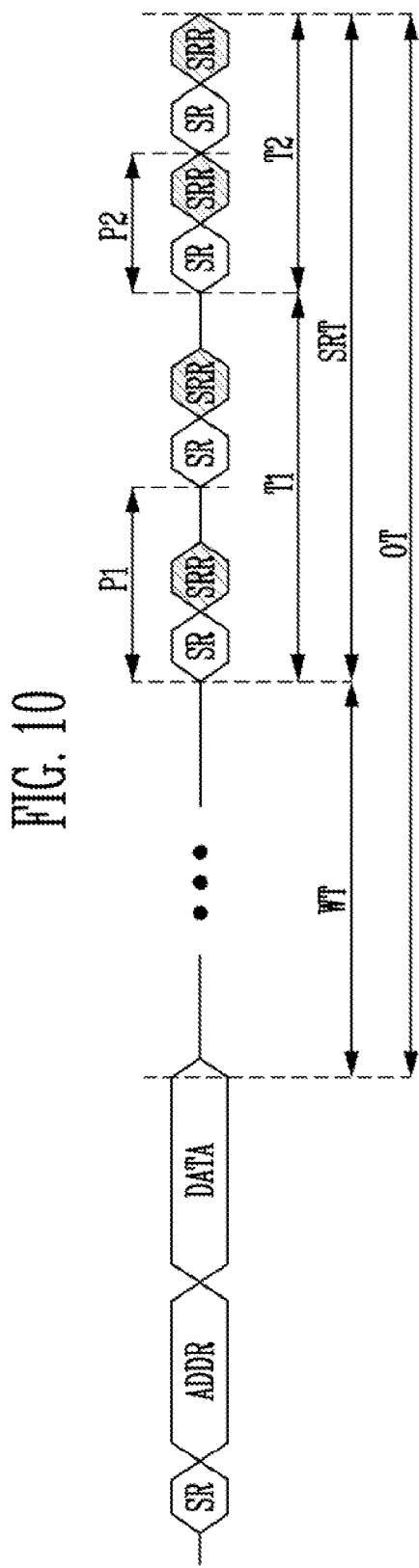
FIG. 10 is a timing diagram illustrating signals communicated between a controller and a semiconductor device according to an operating method shown in FIG. 9.

FIG. 10 is a timing diagram illustrating signals communicated between the controller 200 and the semiconductor device 100 according to the operating method shown in FIG. 9.

Referring to FIG. 10, the controller 200 may output the command CMD, the address ADDR and the data DATA to the semiconductor device 100 and wait for the wait time WT corresponding to the program operation time information OTp stored in the dynamic buffer memory 350 shown in FIG. 8.

After the wait time WT passes, the controller 200 may perform the status reads during the status read period SRT.

The controller 200 may output the status read signal SR to the semiconductor device 100 and receive the status read response signal SRR from the semiconductor device 100. The controller 200 may perform the status reads with the first period P1 until the number of status reads reaches the predetermined threshold. FIG. 10 illustrates performing the status reads with the first period P1 while the number of status reads performed is less than the predetermined threshold during the first time interval T1.

When the number of status reads performed is greater than or equal to the predetermined threshold, for example, three as shown in FIG. 10, the status read may be performed with the second period P2. The controller 200 may perform the status reads with the second period P2 after the number of status reads performed reaches the predetermined threshold. The status reads may be performed until the status read response signal SRR indicating that the semiconductor device 100 completes the corresponding operation for the issued command CMD is received. When the status read response signal SRR indicating that the semiconductor device 100 completes the corresponding operation for the issued command CMD is received, another status read may not be performed. The controller 200 may detect a time interval from output of the command CMD to reception of the status read response signal SRR indicating that the semiconductor device 100 completes the corresponding operation for the issued command CMD as the operation time OT for the program operation, and update the program operation time information OTp, shown in FIG. 8, on the basis of the operation time OT.

According to an embodiment of the present invention, the controller 200 may perform status reads after the wait time WT. In addition, the controller 200 may control the period of the status read after the wait time WT. Therefore, the number of status reads performed may be reduced.

Figure 11:
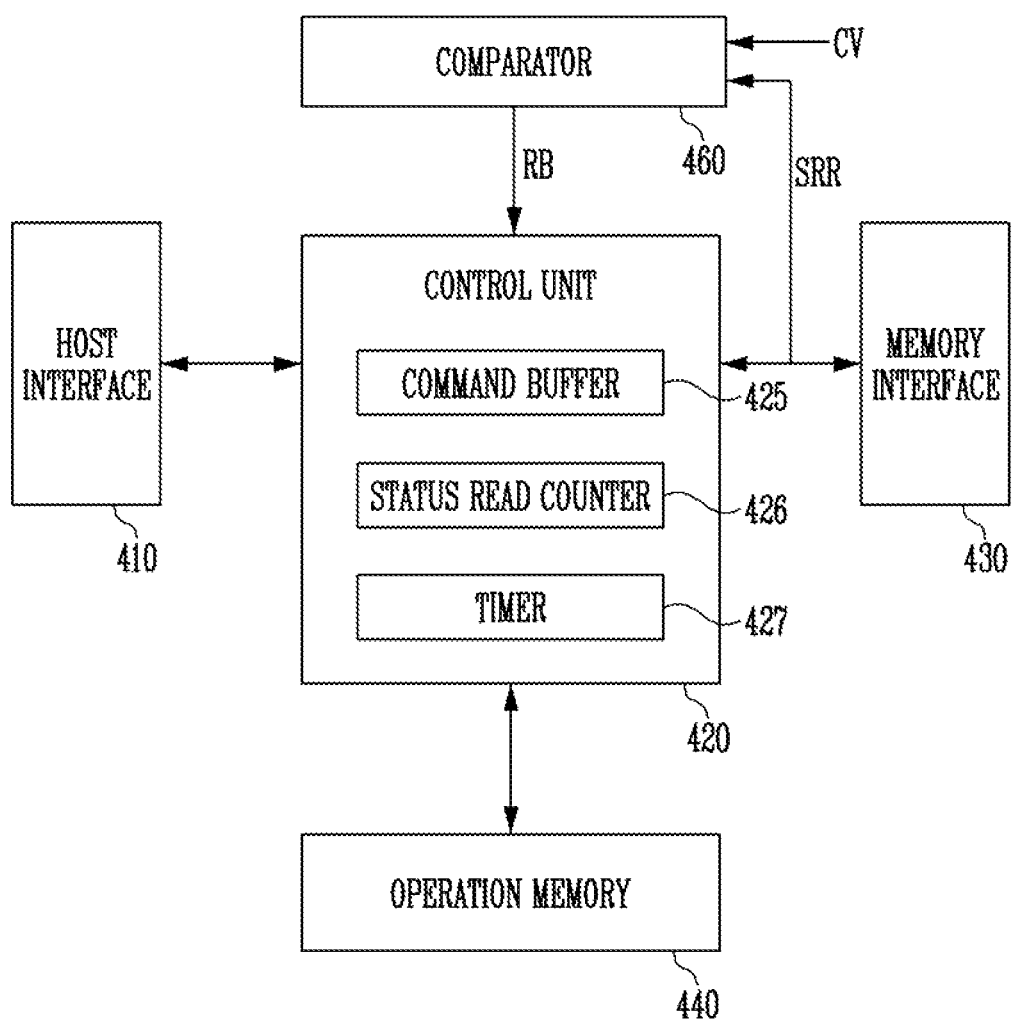
FIG. 11 is a block diagram illustrating a controller shown in FIG. 1 according to another embodiment.

FIG. 11 is a block diagram illustrating the controller 200 shown in FIG. 1 according to another embodiment.

The embodiment shown in FIG. 11 may be substantially the same as the embodiment described with reference to FIGS. 8 to 10 except for the dynamic buffer memory 340. Further, the embodiment shown in FIG. 11 may be substantially the same as the embodiment described with reference to FIGS. 8 to 10 except that duration of the periods before and after the number of status reads reaches the predetermined threshold becomes longer and shorter whenever the status read is performed, respectively.

Referring to FIGS. 1 and 11, a controller 200 may include a host interface 410, a control unit 420, a memory interface 430, an operation memory 440 and a comparator 460.

The host interface 410, the memory interface 430, the operation memory 440 and the comparator 460 may be substantially the same as the host interface 210, the memory interface 230, the operation memory 240 and the comparator 260 described with reference to FIG. 4, respectively.

The control unit 420 may include a command buffer 425, a status read counter 426 and a timer 427. The command buffer 425 may be substantially the same as the command buffer 225 described above with reference to FIG. 4.

The status read counter 426 may be substantially the same as the status read counter 326 described with reference to FIGS. 8 to 10.

The timer 427 may be substantially the same as the timer 327 described with reference to FIGS. 8 to 10 except that the timer 427 may provide more various elapsed time values for varying duration of the period with which the status read is performed.

The control unit 420 may perform status reads after the command of the command buffer 425 is outputted to the semiconductor device 100. According to this embodiment, second status reads may be performed with a period of decreasing duration after the number of first status reads, which are performed with a period of increasing duration, reaches the predetermined threshold. The control unit 420 may perform the first status reads with a period of increasing duration until the number of the first status reads reaches the predetermined threshold, and perform the second status reads with a period of decreasing duration after the number of the first status reads reaches the predetermined threshold, which will be described with reference to FIGS. 12 and 13. The control unit 420 may detect the number of the first status reads based on the count value of the status read counter 426.

According to an embodiment, the period of the first status reads may be set to become longer whenever each of the first status reads is performed until the number of the first status reads reaches the predetermined threshold. For example, the period of the first status reads may be increased whenever each of the first status reads is performed until the number of the first status reads reaches the predetermined threshold. According to the embodiment, the reduced number of status reads may be performed until the number of the first status reads reaches the predetermined threshold.

After the number of the first status reads reaches the predetermined threshold, the period of the second status reads may become reduced whenever the respective second status reads are performed. After the number of the first status reads reaches the predetermined threshold, the corresponding operation for the issued command may be more likely to be completed. By gradually reducing the duration of the period of the second status reads, the controller 200 may quickly detect when the semiconductor device 100 completes the corresponding operation for the issued command.

Figure 12:
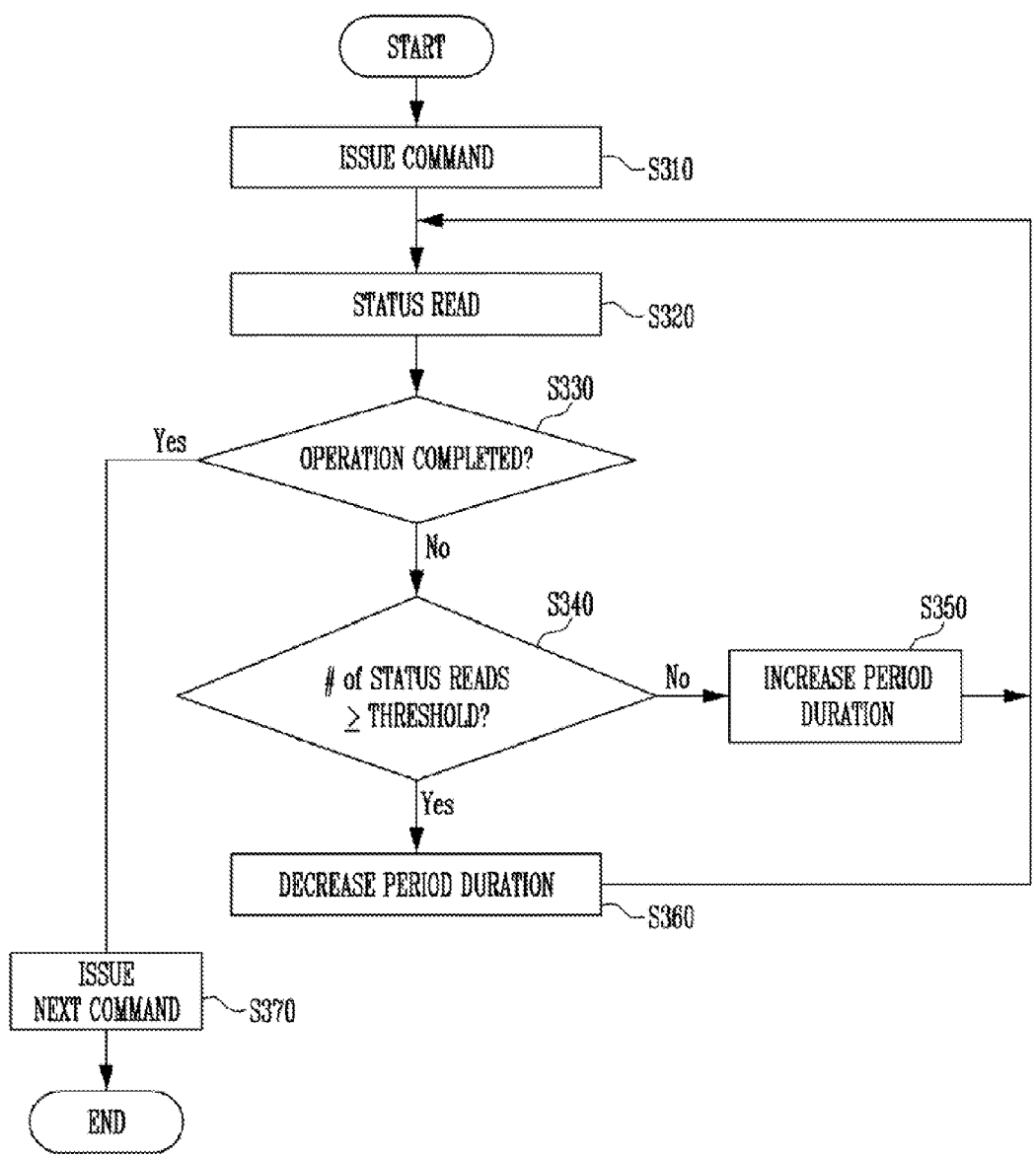
FIG. 12 is a flowchart illustrating an operating method of a controller shown in FIG. 11.

FIG. 12 is a flowchart illustrating an operating method of the controller 200 shown in FIG. 11.

Referring to FIG. 12, steps S310, S320, S330, and S370 may be the same as steps S210, S240, S250, and S270 described with reference to FIG. 9, respectively.

At step S330, as a result of the status read, when the semiconductor device 100 does not complete the corresponding operation for the issued command, the process may go to step S340. The status read may be repeated until the semiconductor device completes the corresponding operation for the issued command. As a result of the status read at step S330, when the semiconductor device 100 completes the corresponding operation for the issued command, step S370 may be performed.

At step S340, when the number of performed first status reads is less than the predetermined threshold, step S350 may be performed. When the number of performed first status reads is greater than or equal to the predetermined' threshold, step S360 may be performed.

At step S350, the controller 200 may increase the duration of the period for the first status read for the next first status read. In other words, the period for the first status reads may be increased whenever each of the first status reads is performed until the number of the first status reads reaches the predetermined threshold.

At step S360, when the number of the first status reads reaches the predetermined threshold, the second status reads may be performed. The controller 200 may reduce the duration of the period for the second status reads for the next second status read. In other words, the duration of the period for the second status reads may be gradually reduced whenever each of the second status reads is performed after the number of the performed first status reads is greater than or equal to the predetermined threshold.

The number of the first status reads may vary according to the predetermined threshold. According to an embodiment, the predetermined threshold may increase as the number of program/erase cycles of the semiconductor device 100 increases. The control unit 420 may store the number of program/erase cycles and control the predetermined threshold in response to the stored number of program/erase cycles. For example, as the number of program/erase cycles increases, the predetermined threshold may increase. According to an embodiment, the predetermined threshold may be provided according to command types. For example, a first predetermined threshold corresponding to the program operation, a second predetermined threshold corresponding to the read operation, and a third predetermined threshold corresponding to the erase operation may be provided.

Figure 13:
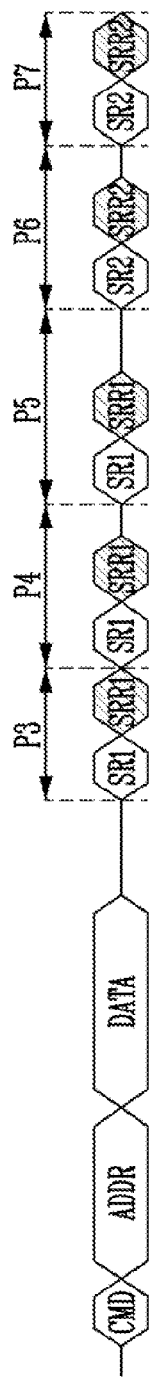
FIG. 13 is a timing diagram illustrating signals communicated between a controller and a semiconductor device according to an operating method shown in FIG. 12.

FIG. 13 is a timing diagram illustrating signals communicated between the controller 200 and the semiconductor device 100 according to the operating method shown in FIG. 12.

Referring to FIG. 13, the controller 200 may output the command CMD, the address ADDR and the data DATA to the semiconductor device 100.

Subsequently, the controller 200 may perform the first status reads. According to an embodiment, the controller 200 may perform the first status reads a predetermined period of time after output of the command CMD. The controller 200 may output a first status read signal SR1 to the semiconductor device 100 and receive the first status read response signal SRR1 from the semiconductor device 100 to perform each first status read. FIG. 13 illustrates performing three first status reads.

Referring to FIG. 13, periods P3 to P5 for the first status reads are the period of gradually increasing duration for the first status reads. The periods P3 to P5 show that the duration of the period for the first status reads may become increased whenever the respective first status reads are performed. For example, the first status read signals SR1 may be outputted in response to periodically toggled reference clocks. More specifically, the period P3 may refer to q reference clocks, the period P4 may refer to 2q reference clocks, and the period P5 may refer to 3q reference clocks, where q is a natural number.

According to another embodiment, the period for the first status reads may not be variable. For example, each of the periods P3 to P5 may correspond to 3q reference clocks.

After the number of the first status reads reaches the predetermined threshold, the controller 200 may perform second status reads. The controller 200 may output a second status read signal SR2 to the semiconductor device 100 and receive a second status read response signal SRR2 from the semiconductor device 100 to perform each second status read.

Referring to FIG. 13, periods P6 and P7 for the second status reads are the period of gradually decreasing duration for the second status reads. Periods P6 and P7 show that the duration of the period for the second status reads may become reduced whenever the respective second status reads are performed. For example, in substantially the same manner as the first status read signals SR1, the second status read signals SR2 may be outputted in response to periodically toggled reference clocks. The period P6 may correspond to 2q reference docks, and the period P7 may correspond to q reference clocks.

When the second status read response signal SRR2 indicating that the semiconductor device 100 completes the corresponding, operation for the issued command is received, another status read may not be performed.

Figure 14:
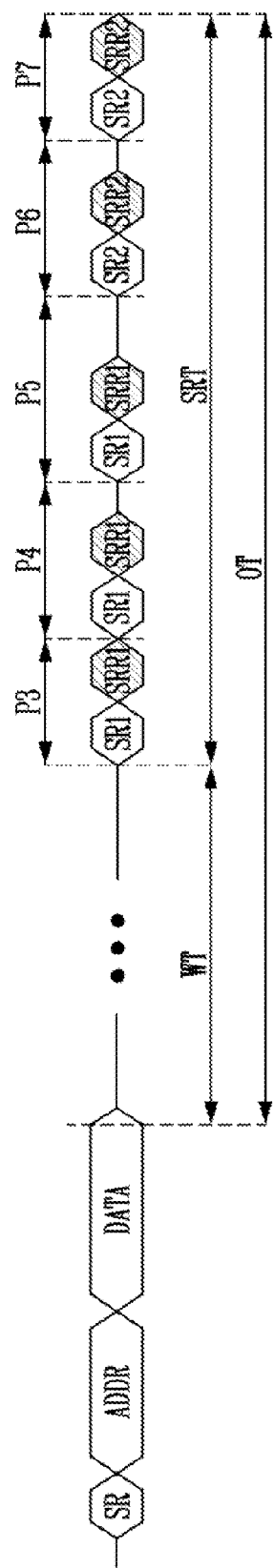
FIG. 14 is a timing diagram illustrating another operating method of a controller shown in FIG. 8.

FIG. 14 is a timing diagram illustrating another operating method of the controller 200 shown in FIG. 8.

Referring to FIG. 14, the controller 200 may output the command CMD, the address ADDR and the data DATA to the semiconductor device 100 and wait for the wait time WT with reference to the program operation time information OTp described with reference to FIG. 8.

After the wait time WT passes, the controller 200 may perform status reads for the status read period SRT. The controller 200 may perform the first status reads until the number of the first status reads reaches the predetermined threshold and then perform the second status reads during the status read period SRT.

The durations of the periods P3 to P5 for the first status reads may be gradually increased whenever each of the first status reads is performed. After the number of the first status reads reaches the predetermined threshold, the durations of the periods P6 and P7 for the second status reads may be gradually reduced whenever each of the second status reads is performed.

According to an embodiment, the controller 200 may quickly detect when the semiconductor device 100 completes the corresponding operation for the issued command by gradually reducing the duration of the period for the second status reads after the number of the first status reads reaches the predetermined threshold. The total number of status reads may be reduced by setting the duration of the period for the first status reads to be much longer. Therefore, the semiconductor system 10 having reduced power consumption may be provided.

According to an embodiment, a semiconductor system having reduced power consumption and improved operation performance and an operating method thereof are provided.

What is claimed is:

1. A semiconductor system, comprising:
   a semiconductor device suitable for receiving and performing a plurality of commands; and
   a controller suitable for determining whether the semiconductor device completes an operation for each of the plurality of commands by performing one or more status reads for the semiconductor device whenever each of the plurality of commands is issued to the semiconductor device,
   wherein the controller issues a first command among the plurality of commands to the semiconductor device, performs the one or more status reads for the semiconductor device to store a time taken to perform the first command as operation time information, and
   wherein the controller issues a second command among the plurality of commands to the semiconductor device, waits for a first wait time determined by the operation time information, and then performs the one or more status reads for the semiconductor device,
   wherein the one or more status reads corresponding to the second command include first status reads, and second status reads, and
   wherein the controller performs each of the first status reads with a first period until a number of the first status reads reaches a predetermined threshold, and then each of the second status reads with a second period.

2. The semiconductor system of claim 1, wherein the first wait time is shorter than the time taken to perform the first command by a predetermined time, or equal to the time taken to perform the first command.

3. The semiconductor system of claim 1,
wherein a command type of each of the plurality of commands corresponds to one of a program command, a read command and an erase command, and
wherein the first command and the second command are the same type of commands.

4. The semiconductor system of claim 1, wherein the controller determines a time taken to perform the second command on the basis of the one or more status reads corresponding to the second command, and updates the operation time information on the basis of the time taken to perform the second command.

5. The semiconductor system of claim 4, wherein the controller issues a third command to the semiconductor device, waits for a second wait time determined by the operation time information updated by the controller, and then performs the one or more status reads for the semiconductor device.

6. The semiconductor system of claim 1, wherein the first period is longer than the second period.

7. The semiconductor system of claim 1,
wherein the one or more status reads corresponding to the second command include a predetermined number of first status reads, and second status reads,
wherein the controller performs the second status reads after performing the predetermined number of the first status reads,
wherein a time interval between the first status reads increases whenever the first status reads are performed, and
wherein a time interval between the second status reads decreases whenever the second status reads are performed.

8. The semiconductor system of claim 1,
wherein the controller includes a dynamic buffer memory, and
wherein the controller stores the operation time information in the dynamic buffer memory.

9. The semiconductor system of claim 1,
wherein the semiconductor device includes non-volatile memory cells, and
wherein the controller stores the operation time information in the non-volatile memory cells.

10. A control method of a semiconductor device, comprising:
issuing a first command to the semiconductor device;
waiting for a first wait time determined by operation time information;
determining whether the semiconductor device completes an operation for the first command by performing one or more status reads for the semiconductor device after the first wait time; and
updating the operation time information on the basis of a time taken to perform the operation for the first command when the semiconductor device completes the operation for the first command,
wherein the status reads include a predetermined number of first status reads and second status reads, and wherein the first status reads are performed with a first period, and the second status reads are performed with a second period.

11. The control method of claim 10, further comprising:
issuing a second command to the semiconductor device;
waiting for a second wait time determined by the operation time information updated on the basis of the time taken to perform the operation for the first command; and
determining whether the semiconductor device completes an operation for the second command by performing the one or more status reads for the semiconductor device after the second wait time.

12. The control method of claim 11, further comprising re-updating the operation time information on the basis of a time taken to perform the operation for the second command when the semiconductor device completes the operation for the second command.

13. The control method of claim 10,
wherein the determining of whether the semiconductor device completes performing the first command comprises:
performing a predetermined number of first status reads; and
performing second status reads after performing the predetermined number of the first status reads,
wherein a time interval between the first status reads increases whenever the first status reads are performed, and
wherein a time interval between the second status reads decreases whenever the second status reads are performed.

14. A semiconductor system, comprising:
a semiconductor device; and
a controller suitable for issuing a command to drive the semiconductor device, and determining whether the semiconductor device completes an operation for the command by performing a plurality of status reads for the semiconductor device after issuing the command,
wherein the controller performs a predetermined number of first status reads among the plurality of status reads, and subsequently performs second status reads among the plurality of status reads, and
wherein a time interval between the second status reads decreases whenever the second status reads are performed.

15. The semiconductor system of claim 14, wherein a time interval between the first status reads increases whenever the first status reads are performed.

16. The semiconductor system of claim 14, wherein a time interval between the first status reads is uniform and longer than the time interval between the second status reads.

17. The semiconductor system of claim 15, wherein the predetermined number is varied by one or more of a number of program operations and a number of erase operations of the semiconductor device.

18. The semiconductor system of claim 15, wherein the controller performs a plurality of status reads for the semiconductor device when a predetermined time passes after issuing the command.

* * * * *